United States Patent
Kim et al.

(10) Patent No.: US 11,297,480 B2
(45) Date of Patent: Apr. 5, 2022

(54) METHOD FOR PERFORMING EMERGENCY CALL AND ELECTRONIC DEVICE THEREFOR

(71) Applicant: Samsung Electronics Co., Ltd., Suwon-si (KR)

(72) Inventors: Sungjun Kim, Suwon-si (KR); Hyunchul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/075,956

(22) Filed: Oct. 21, 2020

(65) Prior Publication Data

US 2021/0136554 A1  May 6, 2021

(30) Foreign Application Priority Data

Oct. 31, 2019 (KR) .......................... 10-2019-0137414

(51) Int. Cl.
| | |
|---|---|
| *H04W 4/90* | (2018.01) |
| *H04W 76/18* | (2018.01) |
| *H04W 76/30* | (2018.01) |
| *H04W 76/50* | (2018.01) |
| *H04W 76/27* | (2018.01) |
| *H04W 84/18* | (2009.01) |

(52) U.S. Cl.
CPC ............. *H04W 4/90* (2018.02); *H04W 76/18* (2018.02); *H04W 76/27* (2018.02); *H04W 76/30* (2018.02); *H04W 76/50* (2018.02); *H04W 84/18* (2013.01)

(58) Field of Classification Search
CPC ....... H04W 4/90; H04W 76/18; H04W 76/30; H04W 76/50; H04W 76/27; H04W 84/18
See application file for complete search history.

(56) References Cited

U.S. PATENT DOCUMENTS

| | | |
|---|---|---|
| 9,986,568 B2 | 5/2018 | Webb et al. |
| 10,104,694 B2 | 10/2018 | Lee et al. |
| 10,136,329 B2 | 11/2018 | Mochizuki et al. |

(Continued)

FOREIGN PATENT DOCUMENTS

| | | | |
|---|---|---|---|
| CN | 104641682 A | * 5/2015 | ............ H04W 36/14 |
| CN | 105191428 A | 12/2015 | |

(Continued)

OTHER PUBLICATIONS

International Search Report dated Feb. 10, 2021, issued in International Application No. PCT/KR2020/013928.

(Continued)

*Primary Examiner* — Matthew C Sams
(74) *Attorney, Agent, or Firm* — Jefferson IP Law, LLP

(57) ABSTRACT

An electronic device is provided. The electronic device includes at least one wireless communication circuit, a processor, and a memory. The memory may store one or more instructions that, when executed, cause the processor to connect with a first cell of a master cell group (MCG) and a second cell of a secondary cell group (SCG) using the at least one wireless communication circuit, detect occurrence of a packet based mobile originated call, release the connection with the second cell when a type of the mobile originated call is an emergency call, and perform the mobile originated call through the first cell.

11 Claims, 9 Drawing Sheets

(56) References Cited

U.S. PATENT DOCUMENTS

| | | | |
|---|---|---|---|
| 10,285,132 B2 | 5/2019 | Soldati | |
| 10,327,128 B2 | 6/2019 | Mochizuki et al. | |
| 10,383,016 B2 | 8/2019 | Kiss et al. | |
| 10,419,916 B1* | 9/2019 | Lei | H04W 4/90 |
| 10,512,116 B2 | 12/2019 | Chang et al. | |
| 10,721,118 B2 | 7/2020 | Hong et al. | |
| 10,873,880 B2 | 12/2020 | Kim et al. | |
| 11,051,155 B2 | 6/2021 | Mochizuki et al. | |
| 11,184,917 B2 | 11/2021 | Zacharias et al. | |
| 2010/0142499 A1* | 6/2010 | Zhang | H04W 12/06 370/338 |
| 2011/0171924 A1* | 7/2011 | Faccin | H04W 4/90 455/404.1 |
| 2011/0171925 A1* | 7/2011 | Faccin | H04W 76/50 455/404.1 |
| 2016/0044743 A1 | 2/2016 | Xu et al. | |
| 2017/0006514 A1 | 1/2017 | Kiss et al. | |
| 2017/0013583 A1* | 1/2017 | Chen | H04W 60/005 |
| 2017/0013668 A1* | 1/2017 | Chang | H04W 76/22 |
| 2017/0105192 A1* | 4/2017 | Tiwari | H04W 24/02 |
| 2017/0215078 A1 | 7/2017 | Mochizuki et al. | |
| 2018/0139788 A1* | 5/2018 | Jhunjhunwala | H04W 76/50 |
| 2018/0255541 A1 | 9/2018 | Webb et al. | |
| 2019/0037382 A1 | 1/2019 | Mochizuki et al. | |
| 2019/0045577 A1 | 2/2019 | Kim et al. | |
| 2019/0215725 A1 | 7/2019 | Kim et al. | |
| 2019/0261155 A1 | 8/2019 | Mochizuki et al. | |
| 2019/0289661 A1* | 9/2019 | Chen | H04W 72/1284 |
| 2020/0015128 A1* | 1/2020 | Stojanovski | H04W 36/0022 |
| 2020/0100313 A1 | 3/2020 | Chang et al. | |
| 2020/0120472 A1 | 4/2020 | Mochizuki et al. | |
| 2020/0267794 A1* | 8/2020 | Baek | H04W 76/19 |
| 2020/0314702 A1* | 10/2020 | Rahman | H04W 36/0069 |
| 2020/0383166 A1* | 12/2020 | Venkataraman | H04W 8/20 |
| 2021/0022171 A1* | 1/2021 | Zacharias | H04W 72/1284 |
| 2021/0051592 A1* | 2/2021 | Wang | H04L 5/001 |
| 2021/0227437 A1* | 7/2021 | Venkataraman | H04W 60/04 |
| 2021/0289335 A1 | 9/2021 | Mochizuki et al. | |

FOREIGN PATENT DOCUMENTS

| | | | |
|---|---|---|---|
| CN | 106105330 A | 11/2016 | |
| CN | 107053134 A | 8/2017 | |
| EP | 3116257 A1 * | 1/2017 | H04W 76/18 |
| KR | 10-0801892 B1 | 2/2008 | |
| KR | 10-2008-0077809 A | 8/2008 | |
| WO | WO-2007045145 A1 * | 4/2007 | H04W 76/18 |
| WO | 2017/196095 A2 | 11/2017 | |
| WO | WO-2020034923 A1 * | 2/2020 | H04W 4/02 |
| WO | WO-2020167170 A1 * | 8/2020 | H04L 5/0098 |
| WO | 2021/015849 A1 | 1/2021 | |

OTHER PUBLICATIONS

Extended European Search Report dated Mar. 3, 2021, issued European Application No. 20203128.2.

Chinese the Office Action dated Dec. 1, 2021, issued in Chinese Patent Application No. 202011191719.X.

European Office Action dated Feb. 7, 2022, issued in European Application No. 20203128.2.

* cited by examiner

METHOD FOR PERFORMING EMERGENCY CALL AND ELECTRONIC DEVICE THEREFOR

CROSS-REFERENCE TO RELATED APPLICATION(S)

This application is based on and claims priority under 35 U.S.C. § 119(a) of a Korean patent application number 10-2019-0137414, filed on Oct. 31, 2019, in the Korean Intellectual Property Office, the disclosure of which is incorporated by reference herein in its entirety.

BACKGROUND

1. Field

The disclosure relates to a method for performing an emergency call and an electronic device therefor.

2. Description of Related Art

After deployment of the $4^{th}$ generation (4G) mobile communication network, a study of $5^{th}$ generation (5G) mobile communication has been conducted in order to keep up with the increase in data traffic. In the 5G mobile communication deployment scenario, access to the 5G mobile communication network based on the 4G mobile communication network may be supported. For example, electronic devices may be simultaneously connected to a plurality of cells associated with different radio access networks (RATs).

In the $5^{th}$ generation mobile communication, electronic devices may be connected to a network based on a non-standalone (NSA) method. For example, the electronic device may be connected to a network according to an E-UTRAN new radio (NR) dual connectivity (EN-DC) method. Here, E-UTRAN may refer to evolved-UTRAN, and UTRAN may refer to a universal mobile telecommunication system (UMTS) radio access network. In this case, a long term evolution (LTE) base station using an evolved packet core (EPC) as a core network may operate as a master base station (e.g., master eNB) of the electronic device. In this case, the LTE base station may anchor signaling of the control plane to the electronic device. A 5G new radio (NR) base station may operate as a secondary base station (e.g., secondary gNB) of the electronic device. The NR base station may transmit and receive data of a user plane to and from the electronic device through a secondary cell group (SCG). For another example, the electronic device may be connected to the network according to the NR E-UTRAN dual connectivity (NE-DC) method. In this case, the NR base station may operate as a master gNB and the LTE base station may operate as a secondary eNB.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method in a multi-radio access technology (MR-DC)-dual connectivity (MR-DC) configuration such as EN-DC or NE-DC, the electronic device may transmit and receive data independently of the gNB or eNB, or may transmit and receive data simultaneously to and from the gNB and eNB. In the MR-DC configuration, if the electronic device transmits data to the gNB and the eNB simultaneously, transmission power of the electronic device may be limited. For example, $3^{rd}$ generation partnership project (3GPP) technical specifications 38.213 requires the transmit power limit of the electronic device in the EN-DC situations. For example, the electronic device may perform simultaneous transmission to a master cell group (MCG) and the SCG. In this case, the sum of the transmission powers of the electronic device to the MCG and the SCG should not exceed the maximum transmission power set for the electronic device. If dynamic power sharing is set in the electronic device, the electronic device may reduce the transmission power for the MCG and/or the SCG such that the sum of the transmission powers to the MCG and the SCG does not exceed the maximum transmission power.

For some services performed by the electronic device, reliability may be more important than data speed. In the MR-DC configuration, transmission power associated with a service may be reduced due to a limit on the maximum transmission power set for the electronic device. In this case, the performance (e.g., reliability) of the service may deteriorate. In addition, packet transmission from the electronic device may be delayed due to the addition and/or release of the SCG. Due to the connection with the SCG, the electronic device may experience additional power consumption and heat generation.

Additional aspects will be set forth in part in the description which follows and, in part, will be apparent from the description, or may be learned by practice of the presented embodiments.

In accordance with an aspect of the disclosure, an electronic device is provided. The electronic device includes at least one wireless communication circuit, a processor operatively connected with the at least one wireless communication circuit, and a memory operatively connected with the processor. The memory may store one or more instructions that, when executed, cause the processor to connect with a first cell of a master cell group (MCG) and a second cell of a secondary cell group (SCG) using the at least one wireless communication circuit, detect occurrence of a packet based mobile originated call, release the connection with the second cell if a type of the mobile originated call is an emergency call, and perform the mobile originated call through the first cell.

In accordance with another aspect of the disclosure, a method for originating a call by an electronic device is provided. The method includes connecting with a first cell of a master cell group (MCG) and a second cell of a secondary cell group (SCG), detecting occurrence of a packet based mobile originated call, releasing the connection with the second cell if a type of the mobile originated call is an emergency call, and performing the mobile originated call through the first cell.

In accordance with another aspect of the disclosure, an electronic device is provided. The electronic device includes a wireless communication circuit, a processor operatively connected to the wireless communication circuit, and a memory operatively connected to the processor. The memory may store one or more instructions that, when executed, cause the processor to receive a connection request requesting a connection to a packet data network (PDN) from an external electronic device using the wireless communication circuit, acquire bearer information regarding at least one bearer associated with the external electronic device if a request type of the connection request corresponds to an emergency service, and transmit, to the external electronic device, a first signal for releasing a second bearer of a second radio access technology (RAT) if the bearer information indicates that the external electronic device is associated with a first bearer of a first RAT and the second bearer of the second RAT.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
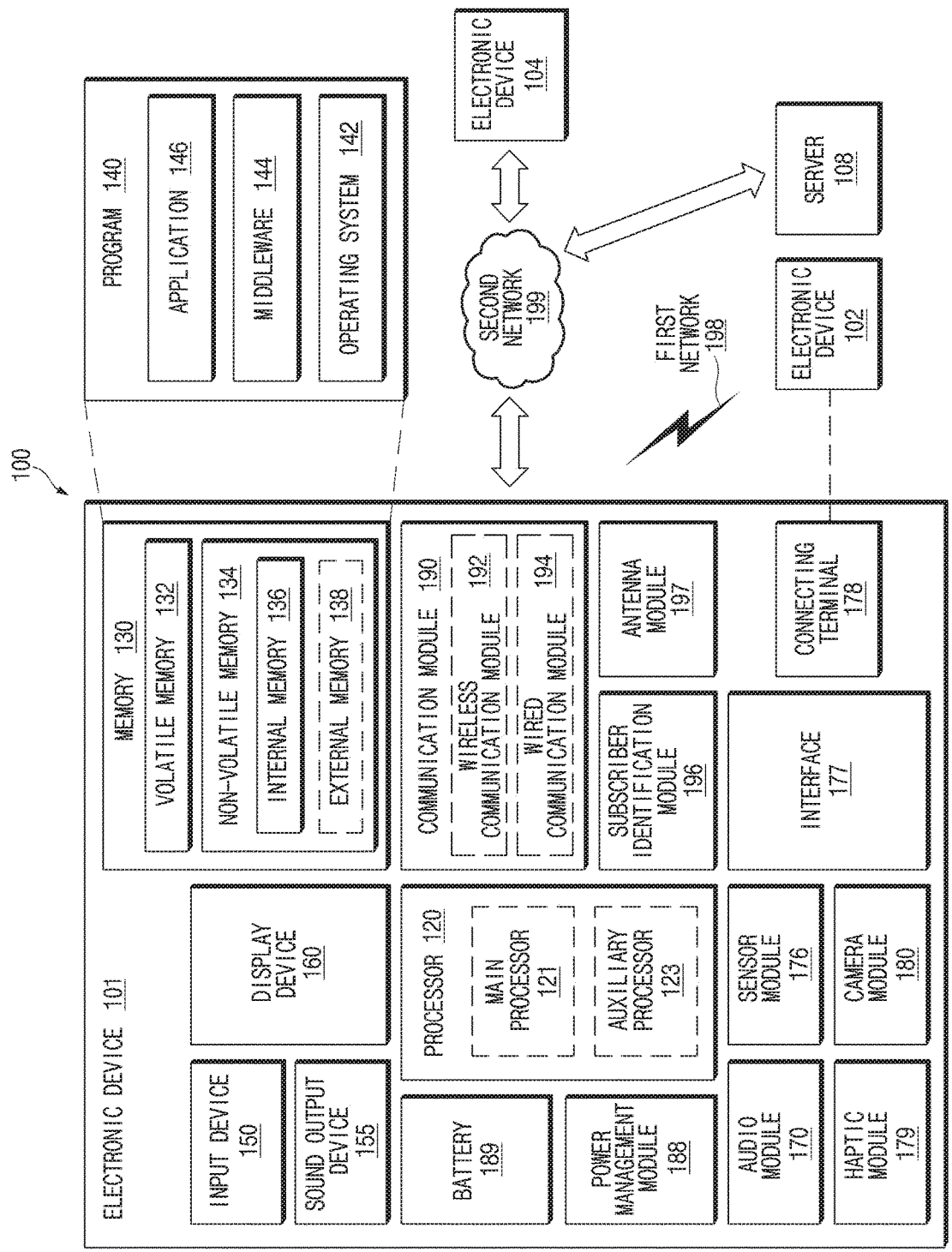
FIG. 1 illustrates a block diagram of an electronic device in a network according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101 According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
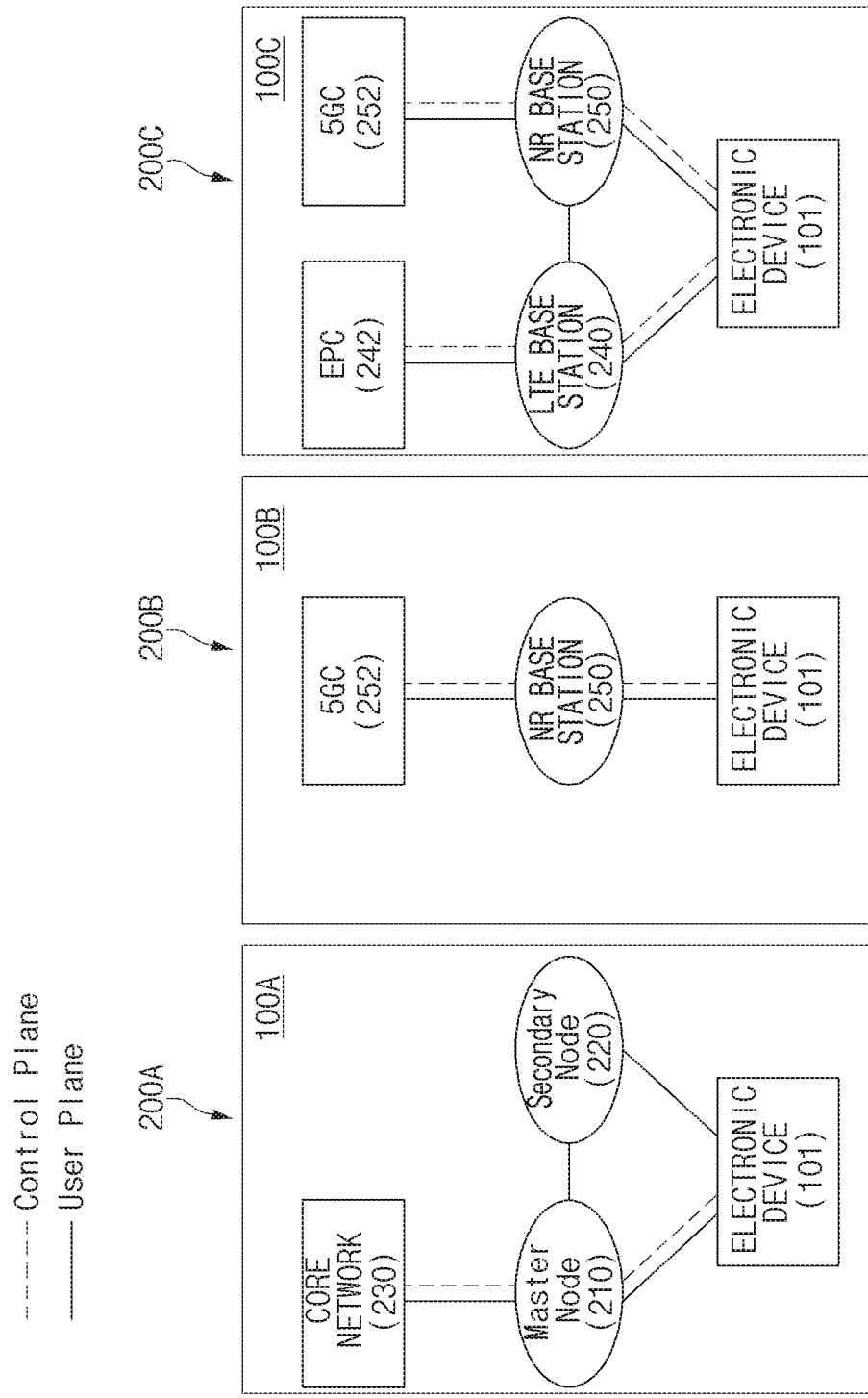
FIG. 2 illustrates wireless communication systems that provide networks of legacy communication and/or 5G communication according to an embodiment of the disclosure.

FIG. 2 illustrates wireless communication systems that provide networks of legacy communication and/or 5G communication according to an embodiment of the disclosure.

Referring to FIG. 2, network environments 100A, 100B, and 100C may include at least one of a legacy network and a 5G network. The legacy network may include, for example, a 3rd generation partnership project (3GPP) standard 4G or an LTE base station 240 (e.g., eNodeB (eNB)) supporting wireless connection with the electronic device 101 and an evolved packet core (EPC) 242 managing 4G communication. The 5G network may include, for example, a new radio (NR) base station 250 (e.g., gNodeB (gNB)) supporting a wireless connection with the electronic device 101 and a 5th generation core (5GC) 252 managing 5G communication of the electronic device 101.

According to various embodiments, the electronic device 101 may transmit and receive a control message and user data through legacy communication and/or 5G communication. The control message may include a message related to at least one of, for example, security control, bearer setup, authentication, registration, or mobility management, of the electronic device 101. The user data may mean, for example, user data excluding control messages transmitted and received between the electronic device 101 and a core network 230 (e.g., EPC 242).

Referring to reference numeral 200A, the electronic device 101 according to an embodiment may transmit and receive at least one of a control message or user data to and from at least some of the 5G network (e.g., the NR base station 250 and the 5GC 252) using at least some of a legacy network (e.g., an LTE base station 240 and the EPC 242).

According to various embodiments, the network environment 100A may include a network environment that provides wireless communication dual connectivity (multi-radio access technology (RAT) dual connectivity (MR-DC)) from the LTE base station 240 and the NR base station 250, and transmits and receives control messages to and from the electronic device 101 through one core network 230 of the EPC 242 or the 5GC 252.

According to various embodiments, in the MR-DC environment, one of the LTE base station 240 or the NR base station 250 may operate as a master node (MN) 210 and the other may operate as a secondary node (SN) 220. The MN 210 may be connected to the core network 230 to transmit and receive control messages. The MN 210 and the SN 220 may be connected through a network interface to transmit and receive messages related to radio resource (e.g., communication channel) management.

According to various embodiments, the MN 210 may be the LTE base station 240, the SN 220 may the NR base station 250, and the core network 230 may be the EPC 242. For example, control messages may be transmitted and received through the LTE base station 240 and the EPC 242, and user data may be transmitted and received through the LTE base station 240 and the NR base station 250.

Referring to reference numeral 200B, according to various embodiments, the 5G network may transmit and receive control messages and user data independently of the electronic device 101.

Referring to reference numeral 200C, the legacy network and the 5G network according to various embodiments may each independently provide data transmission and reception. For example, the electronic device 101 and the EPC 242 may transmit and receive control messages and user data through the LTE base station 240. For another example, the electronic device 101 and the 5GC 252 may transmit and receive control messages and user data through the NR base station 250.

According to various embodiments, the electronic device 101 may be registered with at least one of the EPC 242 and the 5GC 252 to transmit and receive control messages.

According to various embodiments, the EPC 242 or the 5GC 252 may be interworked to manage communication of the electronic device 101. For example, movement information of the electronic device 101 may be transmitted and received through an interface between the EPC 242 and the 5GC 252.

Figure 3:
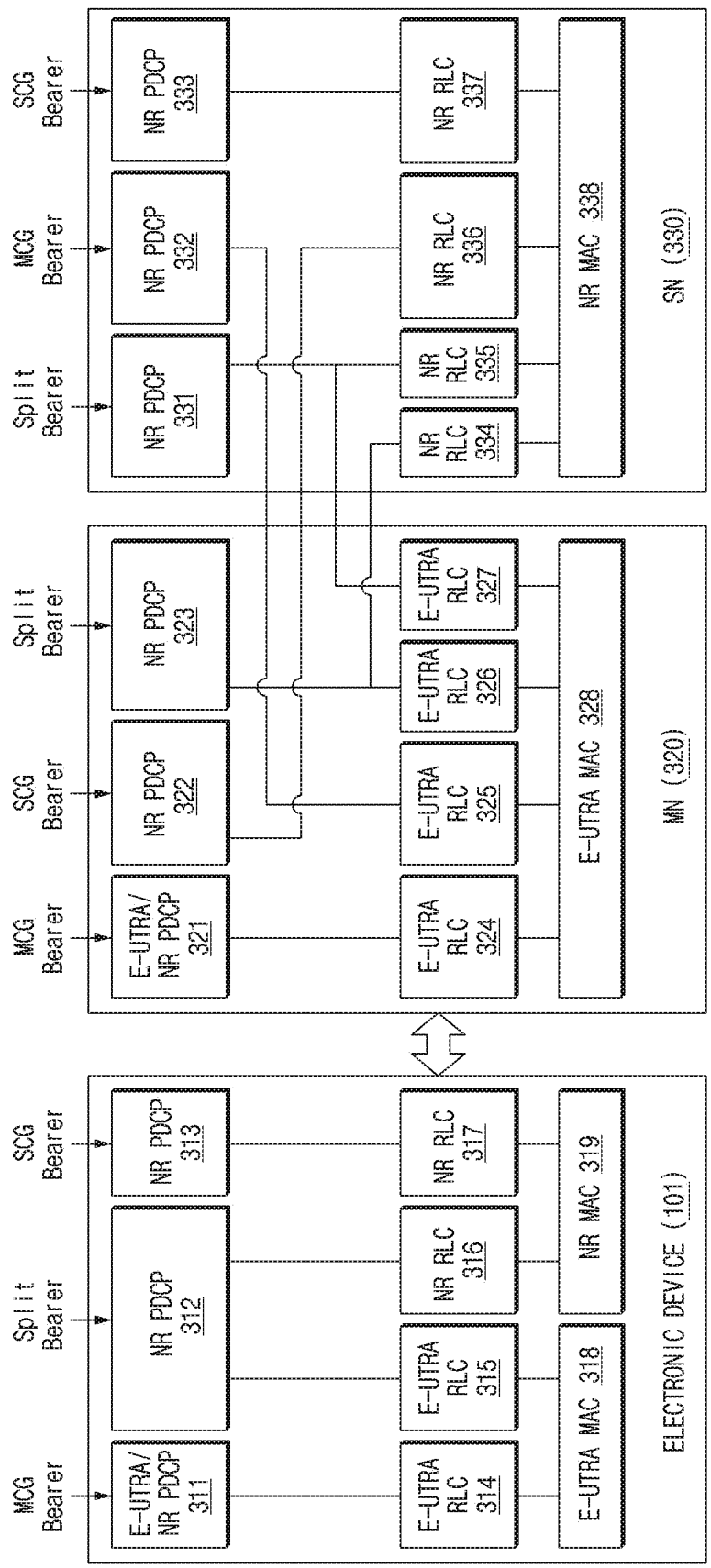
FIG. 3 illustrates a protocol stack structure of an electronic device and a network according to an embodiment of the disclosure.

FIG. 3 illustrates a protocol stack structure of an electronic device and a network according to an embodiment of the disclosure.

According to an embodiment, in the mobile communication system, a base station may communicate with a terminal (e.g., the electronic device 101 of FIG. 1) selectively using an evolved-UMTS(universal mobile telecommunication system) terrestrial radio access (E-UTRA) communication protocol (or LTE communication protocol) and a new radio (NR) communication protocol. For example, the base station and the terminal may communicate using the E-UTRA communication protocol or the NR communication protocol. According to an embodiment, the base station and the terminal may communicate in the MR-DC network environment (e.g., the network environment 100A of FIG. 2). In this case, for example, the base station and the terminal may mix at least a part of the E-UTRA communication protocol and at least a part of the NR communication protocol. For example, the terminal may use different communication protocols for each layer.

In the following embodiments, the E-UTRA protocol stack may be referred to as a first communication protocol stack or a first protocol stack. The first protocol or the first communication protocol may be referred to as the E-UTRA protocol (or LTE protocol). In the following embodiments, an NR protocol stack may be referred to as a second communication protocol stack or a second protocol stack. The second protocol or the second communication protocol may be referred to as an NR protocol. For example, the electronic device 101 may execute the first communication protocol stack and the second communication protocol stack using one or more communication processors (e.g., the wireless communication module 192 of FIG. 1) included in the electronic device 101.

According to an embodiment, the first communication protocol stack and the second communication protocol stack may include a control plane protocol for transmitting and receiving control messages and a user plane protocol for transmitting and receiving user data. The control message may include, for example, a message related to at least one of security control, bearer setup, authentication, registration, or mobility management. The user data may include data other than control messages, for example.

According to an embodiment, the control plane protocol and the user plane protocol may include physical (PHY), medium access control (MAC), radio link control (RLC), or packet data convergence protocol (PDCP) layers. The PHY layer may channel-code and modulate data received from an upper layer (e.g., the MAC layer) and transmit it to a radio channel, and may demodulate and decode the data received through the radio channel and deliver it to the upper layer, for example. The PHY layer included in the second communication protocol stack may further perform an operation related to beam forming. The MAC layer may perform logical/physical mapping on a radio channel to transmit and receive data, and may perform hybrid automatic repeat request (HARQ) for error correction, for example. The RLC layer may perform concatenation, segmentation, or reassembly of data, and may perform the order check, rearrangement, or redundancy check of data, for example. The PDCP layer may perform operations related to encryption (ciphering) and data integrity of control messages and user data, for example. The second communication protocol stack may further include a service data adaptation protocol (SDAP). The SDAP may manage radio bearer allocation based on the quality of service (QoS) of user data, for example.

According to various embodiments, the control plane protocol may include a radio resource control (RRC) layer and a non-access stratum (NAS) layer. The RRC layer may handle control messages related to radio bearer setup, paging, or mobility management, for example. The NAS may handle control messages related to authentication, registration, and/or mobility management, for example.

Referring to FIG. 3, the protocol stack of the electronic device 101 may include at least one of an E-UTRA/NR PDCP 311, an NR PDCP 312, an NR PDCP 313, an E-UTRA RLC 314, an E-UTRA RLC 315, an NR RLC 316, an NR RLC 317, an E-UTRA MAC 318, and/or an NR MAC 319. For example, a master node (MN) 320 (e.g., the master node 210 in FIG. 2) may include at least one of an E-UTRA/NR PDCP 321, an NR PDCP 322, an NR PDCP 323, an E-UTRA RLC 324, an E-UTRA RLC 325, an E-UTRA RLC 326, an E-UTRA RLC 327, and/or an E-UTRA MAC 328. For example, a secondary node (SN) 330 (e.g., the secondary node 220 of FIG. 2) may include an NR PDCP 331, an NR PDCP 332, an NR PDCP 333, an NR RLC 334, an NR RLC 335, an NR RLC 336, an NR RLC 337, and an NR MAC 338.

For example, the electronic device 101 may communicate with the MN 320 using a master cell group (MCG) bearer and may communicate with the SN 330 using a secondary cell group (SCG) bearer. In this case, the protocol stack of the electronic device 101 associated with the MCG bearer may include an E-UTRA protocol stack (e.g., the E-UTRA/NR PDCP 311, the E-UTRA RLC 314, and the E-UTRA MAC 318). The protocol stack of the electronic device 101 associated with the SCG bearer may include an NR protocol stack (e.g., the NR PDCP 313, the NR RLC 317, and the NR MAC 319).

For another example, the electronic device 101 may communicate with the MN 320 and the SN 330 using a split bearer (e.g., an MCG split bearer or an SCG split bearer). In this case, the protocol stack of the electronic device 101 associated with the split bearer may include the NR PDCP 312, the E-UTRA RLC 315, the NR RLC 316, the E-UTRA MAC 318, and the NR MAC 319. In the case of the split bearer, the electronic device 101 may use the NR protocol stack (e.g., the NR PDCP 312) in the PDCP layer, but may use the E-UTRA protocol stack (e.g., the E-UTRA RLC 315 and the E-UTRA MAC 318) in the lower layer (e.g., the RLC/MAC/PHY). In this case, the NR PDCP 312 may separate and/or aggregate the data received through the split bearer to transmit it to the E-UTRA RLC 315 or the NR RLC 316.

For another example, the electronic device 101 may communicate with the SN 330 using a secondary node (SN) terminated MCG bearer. In this case, the electronic device 101 may use the NR protocol stack (e.g., E-UTRA/NR PDCP 311) in the PDCP layer, but may use the E-UTRA protocol stack (e.g., the E-UTRA RLC 314 and the E-UTRA MAC 318) in the RLC and MAC layers.

For another example, the electronic device 101 may communicate with the MN 320 using a master node (MN) terminal SCG bearer. In this case, the electronic device 101 may include the NR protocol stack (e.g., the NR PDCP 313, the NR RLC 317, and the NR MAC 319) in the PDCP, RLC, and MAC layers.

As in the various examples described above, various types of bearers (e.g., the MCG bearer, the SCG bearer, the MCG split bearer, the SCG split bearer, the MN-terminated SCG bearer, and/or the SN-terminated MCG bearer) may be used for communication between the electronic device 101 and respective nodes (e.g., the MN 320 and/or the SN 330). In such a communication environment, the type of bearer used for communication of the electronic device 101 may be changed. For example, the electronic device 101 may move from a first cell supporting EN-DC to a second cell not supporting EN-DC. In this case, with the change of the cell type, the electronic device 101 may change the bearer type to a bearer of a type different from the bearer set based on the EN-DC environment. For another example, the electronic device 101 may use a bearer based on the NR PDCP 312 supporting EN-DC. In this case, the type of bearer associated with the electronic device 101 may be changed according to the determination of the network. The type of bearer associated with the electronic device 101 may be changed from the bearer based on the NR PDCP 312 to the bearer based on the E-UTRA/NR PDCP 311.

Figure 4:
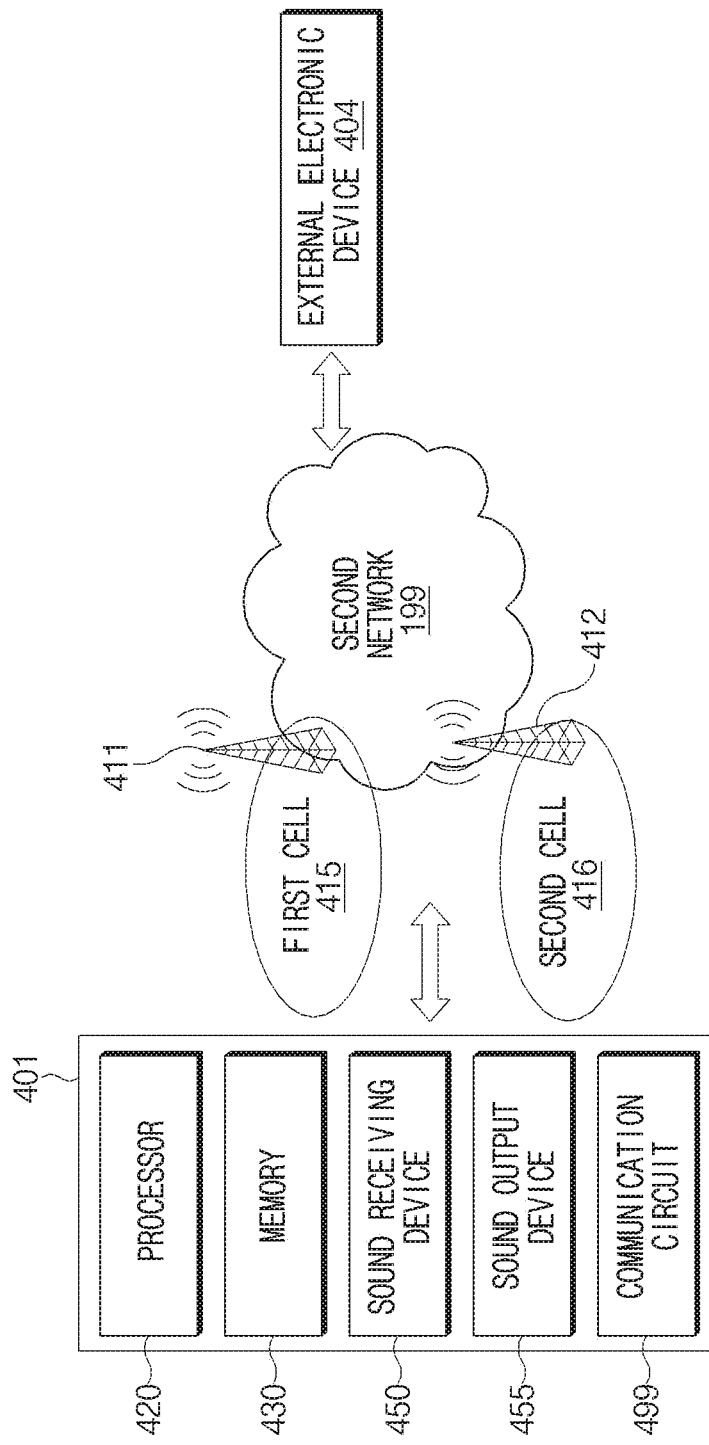
FIG. 4 illustrates a communication environment of an electronic device with an external electronic device according to an embodiment of the disclosure.

FIG. 4 illustrates a communication environment of an electronic device with an external electronic device, according to an embodiment of the disclosure.

Referring to FIG. 4, an electronic device 401 (e.g., the electronic device 101 of FIG. 1) may include a processor 420 (e.g., the processor 120 of FIG. 1 (e.g., an application processor) and/or the communication module 190 of FIG. 1 (e.g., a communication processor)), a memory 430 (e.g., the memory 130 of FIG. 1), a sound receiving device 450 (e.g., the input device 150 of FIG. 1), a sound output device 455 (e.g., the sound output device 155 of FIG. 1), and a communication circuit 499 (e.g., the communication module 190 of FIG. 1). The configurations of the electronic device 401 illustrated in FIG. 4, and embodiments of the disclosure are not limited thereto. For example, the electronic device 401 may not include at least one of the components illustrated in FIG. 4. For another example, the electronic device 401 may further include a component (e.g., a display) not illustrated in FIG. 4.

According to an embodiment, the processor 420 may be operatively connected to the memory 430, the sound receiving device 450, the sound output device 455, and the communication circuit 499. The processor 420 may control components of the electronic device 401 (e.g., the memory 430, the sound receiving device 450, the sound output device 455, and the communication circuit 499). For example, the processor 420 may control the components of the electronic device 401 according to one or more instructions stored in the memory 430. The processor 420 may include an application processor and/or a communication processor.

According to an embodiment, the sound receiving device 450 may receive sound. For example, the sound receiving device 450 may include or be connected to a microphone for receiving an acoustic signal. The sound receiving device 450 may convert the received analog sound signal into a digital signal.

According to an embodiment, the sound output device 455 may output sound. For example, the sound output device 455 may include at least one speaker for outputting a sound signal.

According to an embodiment, the communication circuit 499 may provide the electronic device 401 with communication with an external electronic device 404 through at least one network. For example, the communication circuit 499 may be configured to communicate with the external electronic device 404 through the first base station 411 and/or the second base station 412. For example, the first base station 411 and the second base station 412 may support communication between the electronic device 401 and the external electronic device 404 through the second network 199 (e.g., a cellular network).

A first cell 415 may be a cell associated with the first base station 411, and a second cell 416 may be a cell associated with the second base station 412. For example, the first cell 415 may be a cell of a first RAT, and the second cell 416 may be a cell of a second RAT different from the first RAT. As one example, the first base station 411 may be the LTE base station, and the second base station 412 may be the NR base station. If the electronic device 401 is connected to the first base station 411 and the second base station 412 according to the EN-DC setting, the first cell 415 is a cell of the MCG, and the second cell 416 is a cell of the SCG. In FIG. 4, the first base station 411 and the second base station 412 are illustrated as separate base stations; however, the embodiments of the disclosure are not limited thereto. For example, the first base station 411 and the second base station 412 may be implemented as one base station.

According to various embodiments, the electronic device 401 may be a device configured to perform a call. The electronic device 401 may be configured to perform a call based on packet data. For example, the electronic device 401 may be configured to perform a video call and/or a voice call based on packet data. The electronic device 401 may be configured to perform a packet based call through a cellular network.

For example, the electronic device 401 may be simultaneously connected to the first cell 415 (e.g., a cell of the MCG) and the second cell 416 (e.g., a cell of the SCG). The electronic device 401 may be in a radio resource control (RRC) connected state. For example, the electronic device 401 may transmit and receive data of the control plane through the first cell 415 and may transmit and receive data of the user plane through the second cell 416. For another example, the electronic device 401 may transmit and receive data of the user plane through the first cell 415 and may transmit and receive data of the control plane through the second cell 416.

According to an embodiment, in order to prevent deterioration of service quality due to dual connectivity, the electronic device 401 may release the connection with the SCG (e.g., the second cell 416) in response to a specified service request. For example, the electronic device 401 may provide a specified service through the MCG (e.g., the first cell 415). For example, the specified service may be a service requiring high reliability. The service requiring high reliability may be a service requiring a relatively low data rate. The service requiring high reliability may be determined based on the characteristics of the service. For example, the service requiring high reliability may be an emergency call. The emergency call may be performed at a relatively low data rate while the characteristics of the service require high reliability. In various embodiments described below, the emergency call will be mainly described; however, embodiments of the disclosure are not limited thereto.

According to various embodiments, the electronic device 401 may release a connection to the SCG if an emergency call request is received. For example, the electronic device 401 may receive a call request (e.g., a mobile originated (MO) call) from a call application. If the call request is received, the electronic device 401 may determine whether the type of the call request corresponds to an emergency call. If the type of the call is the emergency call, the electronic device 401 may determine whether the electronic device 401 is currently in a state of being connected to the MCG (e.g., the first cell 415) and the SCG (e.g., the second cell 416) (e.g., dual connectivity state). If the electronic device 401 is in a dual connectivity state and receives the emergency call request, the electronic device 401 may release the bearer of the SCG. The electronic device 401 may perform the emergency call through the bearer of the MCG. For example, if the master base station of the electronic device 401 is the first base station 411, the electronic device 401 may perform a voice over LTE (VoLTE) call. In this case, the electronic device 401 may release the NR dedicated bearer of the SCG and may perform the VoLTE call through the bearer of the MCG. For another example, if the master base station of the electronic device 401 is the second base station 412, the electronic device 401 may perform a voice over NR (VoNR) call. In this case, the electronic device 401 may release the LTE dedicated bearer of the SCG and perform the VoNR call through the bearer of the MCG.

According to an embodiment, if the emergency call is detected, the electronic device 401 may transmit information for SCG release to the master base station. For example, the electronic device 401 may transmit information for SCG release to the base station using an RRC message. For example, the RRC message may include SCG failure information. In the case of SCG radio link failure, SCG reconfiguration failure, or the like, the 3GPP technology standard allows user equipment to transmit SCG failure information to a base station. Upon receiving the SCG failure information, the base station may transmit, to the user equipment, a message for reconfiguration of RRC connection. The message for RRC connection reconfiguration (e.g., RRC reconfiguration) may include information about the change of the radio bearer. The message for RRC connection reconfiguration may indicate release of the bearer for the SCG. In this case, the electronic device 401 may transmit the SCG failure information in response to the emergency call and may release a radio bearer associated with the SCG by receiving the message for RRC connection reconfiguration from the base station.

According to an embodiment, the electronic device 401 may include information on an SCG failure cause in the information for SCG release. For example, the SCG failure cause may be set to any value. For another example, the SCG failure cause may be set to a dedicated value corresponding to the emergency call.

According to an embodiment, the base station may transmit, to the electronic device 401, a message for RRC connection reconfiguration for SCG addition after the emergency call is terminated. For example, if the SCG failure cause received from the electronic device 401 is a specified value (e.g., a dedicated value corresponding to the emergency call), the base station may transmit, to the electronic device 401, the RRC connection reconfiguration message for addition of the SCG after the emergency call is terminated. For another example, the electronic device 401 may transmit, to the base station, a message for adding SCG connection or a message indicating termination of the emergency call after the emergency call is terminated. The base station may transmit, to the electronic device 401, the RRC connection reconfiguration message for addition of the SCG after receiving the message from the electronic device 401.

According to various embodiments, the electronic device 401 may not establish the RRC connection to the SCG if the emergency call request is detected in an RRC idle state. If the electronic device 401 is in the RRC idle state, the electronic device 401 may perform the RRC connection in order to perform an emergency call in response to a request for the emergency call. For example, the electronic device 401 may transition to the RRC connection state by performing an RRC connection procedure. In the RRC connection procedure, the electronic device 401 may include operations of transmitting the RRC connection request to a base station (e.g., the master base station), transmitting an RRC connection setup message to the electronic device 401 by the base station, and transmitting an RRC connection setup completion message to the base station by the electronic device 401. The RRC connection setup message may include information on radio resources for the electronic device 401 to establish the RRC connection. If the electronic device 401 supports MR-DC, the electronic device 401 is required to perform frequency measurement on not only LTE radio resources but also NR radio resources, and to establish dual connection according to the frequency measurement result. According to an embodiment of the disclosure, even if radio resource information corresponding to the SCG is received from the base station, the electronic device 401 may omit frequency measurement for the SCG radio resource in the RRC connection procedure corresponding to the emergency call. In this case, the electronic device 401 may not add a dedicated bearer for the SCG. The electronic device 401 may reduce the time and current consumption for RRC connection by skipping the frequency measurement for the SCG radio resource.

For example, for EN-DC, the first base station 411 may transmit, to the electronic device 401, radio resource information associated with the MCG (e.g., the first cell 415) and the SCG (e.g., the second cell 416). If the emergency call is detected in the RRC idle state, the electronic device 401 may perform frequency measurement for the MCG and may skip the frequency measurement for the SCG. The electronic device 401 may establish only an LTE-dedicated bearer to the first base station 411 in response to the emergency call, and may perform the emergency call through the LTE-dedicated bearer.

For another example, for NE-DC, the second base station 412 may transmit, to the electronic device 401, radio resource information associated with the MCG (e.g., the second cell 416) and the SCG (e.g., the first cell 415). If the emergency call is detected in the RRC idle state, the electronic device 401 may perform frequency measurement for the MCG and may skip the frequency measurement for the SCG. The electronic device 401 may establish only an NR-dedicated bearer to the second base station 412 in response to the emergency call, and may perform the emergency call through the NR-dedicated bearer.

In the above-described examples, the electronic device 401 has been described as releasing the bearer associated with the SCG; however, embodiments of the disclosure are not limited thereto. According to various embodiments, a base station (e.g., the master base station among the first base station 411 and the second base station 412) may release the bearer associated with the SCG of the electronic device 401 based on the connection request received from the electronic device 401. For example, the electronic device 401 may transmit a PDN connectivity request to the base station in order to perform the emergency call. In this case, the request type of the PDN connectivity request may be set to emergency. According to an embodiment, if the PDN connectivity request set as an emergency type is received from the electronic device 401, the base station may release the bearer of the SCG associated with the electronic device 401. The base station may cause the electronic device 401 to release the bearer of the SCG by transmitting, to the electronic device 401, the RRC connection reconfiguration message.

For example, for EN-DC, the first base station 411 may receive an emergency type of PDN connectivity request from the electronic device 401. In this case, the first base station 411 may determine whether the electronic device 401 is connected to the MCG and the SCG. If the electronic device 401 is connected to the MCG and the SCG, the first base station 411 may transmit, to the electronic device 401, the RRC connection reconfiguration message, which instructs removal of the SCG, in order to release the bearer associated with the SCG.

For another example, for NE-DC, the second base station 412 may receive an emergency type of PDN connectivity request from the electronic device 401. In this case, the second base station 412 may determine whether the electronic device 401 is connected to the MCG and the SCG. If the electronic device 401 is connected to the MCG and the SCG, the second base station 412 may transmit, to the electronic device 401, the RRC connection reconfiguration message, which instructs removal of the SCG, in order to release the bearer associated with the SCG.

According to an embodiment, the electronic device 401 may include at least one wireless communication circuit (e.g., the communication circuit 499), a processor (e.g., the processor 420) operatively connected with the at least one wireless communication circuit, and a memory (e.g., the memory 430) operatively connected with the processor. The memory may store one or more instructions that, when executed, cause the processor to perform operations to be described below.

The processor may connect with a first cell (e.g., the first cell 415) of a master cell group (MCG) and a second cell (e.g., the second cell 416) of a secondary cell group (SCG) using the at least one wireless communication circuit, detect occurrence of a packet based mobile originated call, release the connection with the second cell if a type of the mobile originated call is an emergency call, and perform the mobile originated call through the first cell.

The processor may transmit information indicating a radio link failure for the SCG to the first cell in order to release the connection with the second cell. For example, the processor may transmit information indicating the radio link failure for the SCG through radio resource control (RRC) signaling.

The processor may receive, from the first cell, information indicating release of the SCG set in the electronic device in response to the information indicating the radio link failure for the SCG. For example, the information indicating the release of the SCG may be included in a radio resource control (RRC) connection reconfiguration message.

The processor may maintain the connection with the first cell and the second cell and perform the mobile originated call if the type of the mobile originated call is not an emergency call.

For example, a first radio access technology (RAT) associated with the first cell and a second RAT associated with the second cell may be different from each other. The first RAT may be associated with long-term evolution (LTE), and the second RAT may be associated with new radio (NR).

A method for originating a call by the electronic device 401 may include connecting with a first cell of a master cell group (MCG) and a second cell of a secondary cell group (SCG), detecting occurrence of a packet based mobile originated call, releasing the connection with the second cell if a type of the mobile originated call is an emergency call, and performing the mobile originated call through the first cell.

The releasing of the connection with the second cell may include transmitting information indicating a radio link failure for the SCG to the first cell. For example, the transmitting of the information indicating the radio link failure for the SCG may include transmitting the information indicating the radio link failure for the SCG through radio resource control (RRC) signaling.

The releasing of the connection with the second cell may further include receiving, from the first cell, information indicating release of the SCG set in the electronic device in response to the information indicating the radio link failure for the SCG. The information indicating the release of the SCG may be included in a radio resource control (RRC) connection reconfiguration message.

The method may further include maintaining the connection with the first cell and the second cell and performing the mobile originated call if the type of the mobile originated call is not an emergency call.

For example, a radio access technology (RAT) of the first cell may be associated with long-term evolution (LTE), and a RAT of the second cell may be associated with new radio (NR).

The first base station 411 may include a wireless communication circuit, a processor operatively connected to the wireless communication circuit, and a memory operatively connected to the processor. The memory may store one or more instructions that, when executed, cause the processor to receive a connection request requesting a connection to a packet data network (PDN) from an external electronic device (e.g., the electronic device 401) using the wireless communication circuit, acquire bearer information regarding at least one bearer associated with the external electronic device if a request type of the connection request corresponds to an emergency service, and transmit, to the external electronic device, a first signal for releasing a second bearer of a second radio access technology (RAT) if the bearer information indicates that the external electronic device is associated with a first bearer of a first RAT and the second bearer of the second RAT.

For example, the first signal may include information for radio resource control (RRC) connection reconfiguration. The information for the RRC connection reconfiguration may indicate release of a cell associated with the second RAT. An access point name (APN) of the first bearer may be set to SOS. The first RAT may be associated with long-term evolution (LTE), and the second RAT may be associated with new radio (NR).

Hereinafter, various operations of the electronic device 401 will be described with reference to FIGS. 5 to 8. In the following example, description will be made based on the EN-DC situation; however, as described above, the embodiments to be described later may be similarly applied to NE-DC. For example, operations of the first base station 411 may be performed by the second base station 412.

Figure 5:
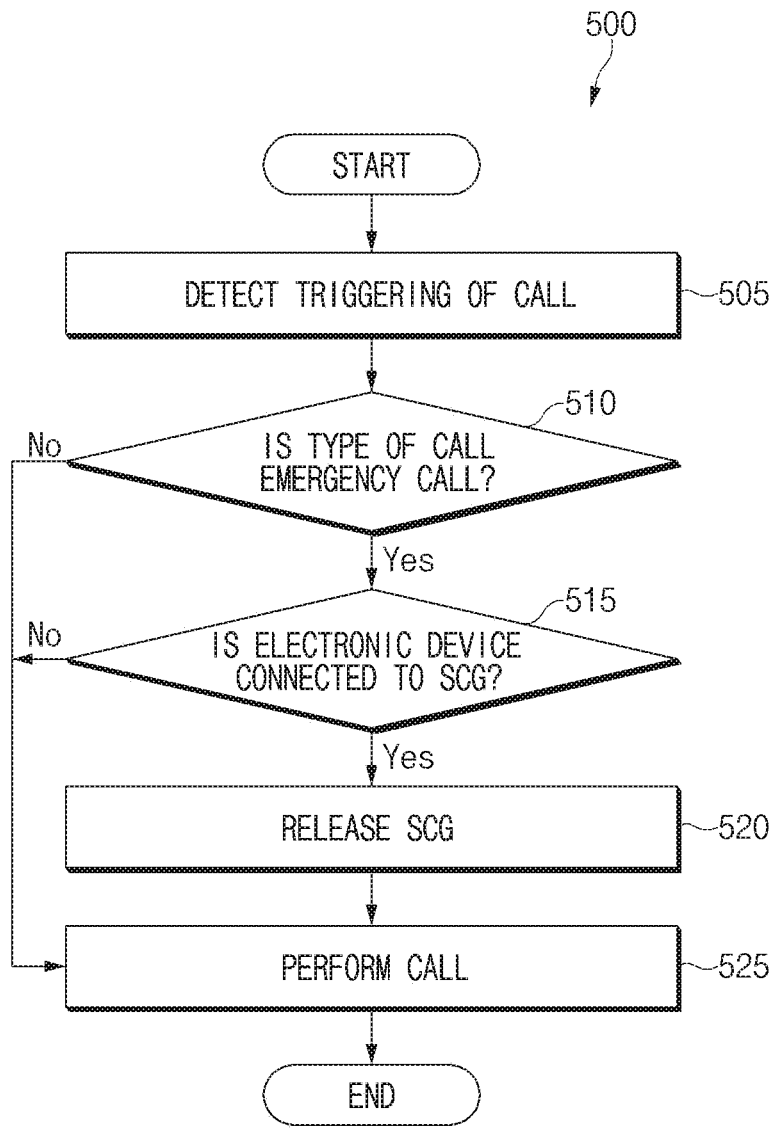
FIG. 5 illustrates a flowchart of a method for performing a call by an electronic device according to an embodiment of the disclosure.

FIG. 5 illustrates a flowchart of a method for performing a call by an electronic device according to an embodiment of the disclosure.

Referring to FIG. 5, a memory (e.g., the memory 430 of FIG. 4) of an electronic device (e.g., the electronic device 401 of FIG. 4) may store one or more instructions that when executed, cause a processor (e.g., the processor 420 of FIG. 4) to perform operations (e.g., of a flowchart 500) to be described later. In the example of FIG. 5, the electronic device 401 may be assumed to be in an RRC connection state. If the electronic device 401 is not in the RRC connection state, the electronic device 401 may perform a call according to an example of FIG. 6.

In operation 505, the processor 420 may detect triggering of a call. For example, the processor 420 may detect triggering of a call based on a user input to a call application.

In operation 510, the processor 420 may determine whether the type of the call is an emergency call. For example, the processor 420 may determine whether the type of the call is an emergency call based on a phone number associated with the call. If the phone number associated with the call is a designated number, the processor 420 may determine that the type of the call is an emergency call. For another example, the processor 420 may receive information on the type of the call from a call application. If the information on the call type indicates emergency, the processor 420 may determine that the call type is an emergency call.

If the type of the call is not an emergency call (No in operation 510), the processor 420 may perform the call regardless of whether the SCG is connected. In operation 515, if the call type is the emergency call (Yes in operation 510), the processor 420 may determine whether the electronic device 401 is connected to the SCG.

If the electronic device 401 is connected to the SCG (Yes in operation 515), in operation 520, the processor 420 may release the connection to the SCG. For example, the electronic device 401 may transmit an RRC message allowing the first base station 411 to transmit a message for removing the SCG connection. The RRC message may include SCG failure information. For example, the SCG failure information may include a specified cause. The first base station 411 may transmit, to the electronic device 401, an RRC connection reconfiguration message indicating the removal of the SCG connection, in response to the SCG failure information. The electronic device 401 may release the SCG connection by reconfiguring the connection according to the RRC connection reconfiguration message.

If the electronic device 401 is not connected to the SCG (No in operation 515) or after the release of the SCG connection (e.g., operation 520), in operation 525, the processor 420 may perform a call using an MCG-related bearer. For example, the processor 420 may perform a VoLTE call.

Figure 6:
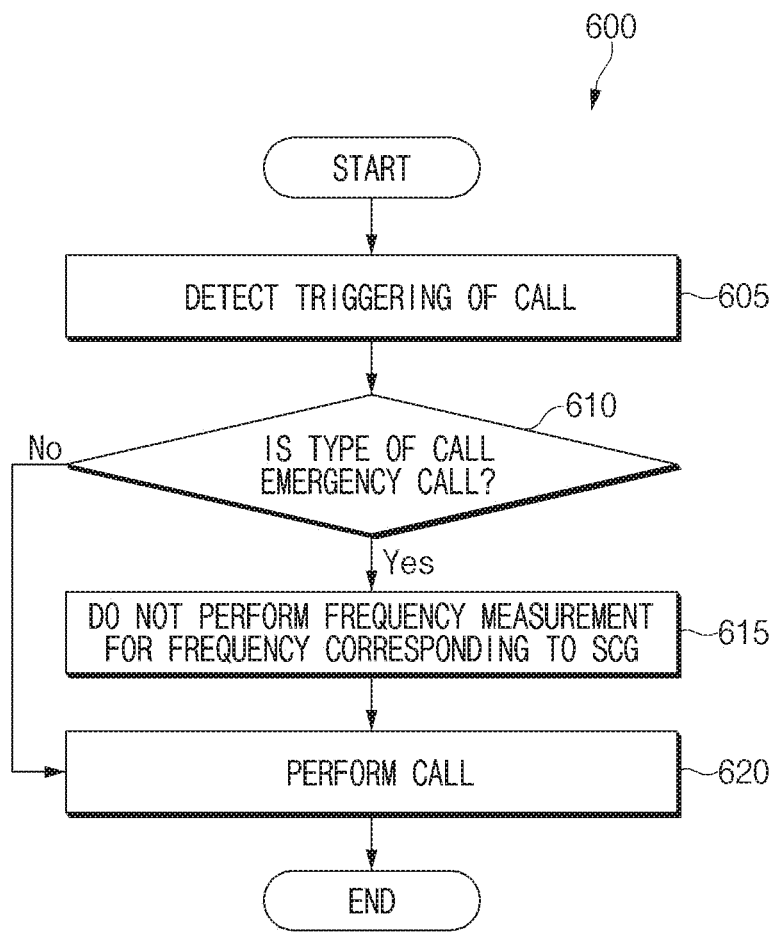
FIG. 6 illustrates a flowchart of a method for performing a call by an electronic device according to an embodiment of the disclosure.

FIG. 6 illustrates a flowchart of a method for performing a call by the electronic device according to an embodiment of the disclosure.

Referring to FIG. 6, a memory (e.g., the memory 430 of FIG. 4) of an electronic device (e.g., the electronic device 401 of FIG. 4) may store one or more instructions that when executed, cause a processor (e.g., the processor 420 of FIG.

4) to perform operations (e.g., a flowchart 600) described later. In the example of FIG. 6, the electronic device 401 may be assumed to be in an RRC idle state.

In operation 605, the processor 420 may detect triggering of a call. For example, the processor 420 may detect triggering of a call based on a user input to a call application.

In operation 610, the processor 420 may determine whether the type of the call is an emergency call. The description of operation 610 may be referred to by description of operation 510 of FIG. 5.

If the type of the call is not an emergency call (No in operation 610), in operation 620, the processor 420 may perform the call after RRC connection reconfiguration.

When the type of the call is an emergency call (Yes in operation 610), in operation 615, the processor 420 may not perform frequency measurement for a frequency corresponding to the SCG. For example, the processor 420 may receive, from the first base station 411, information on frequency bands corresponding to the MCG and the SCG. The processor 420 may perform frequency measurement on a frequency band corresponding to the MCG, and establish an RRC connection with the MCG based on the measurement result.

After establishing the RRC connection with the MCG, in operation 620, the processor 420 may perform a call. In this case, the electronic device 401 may perform an emergency call through the cell of the MCG (e.g., the first cell).

Figure 7:
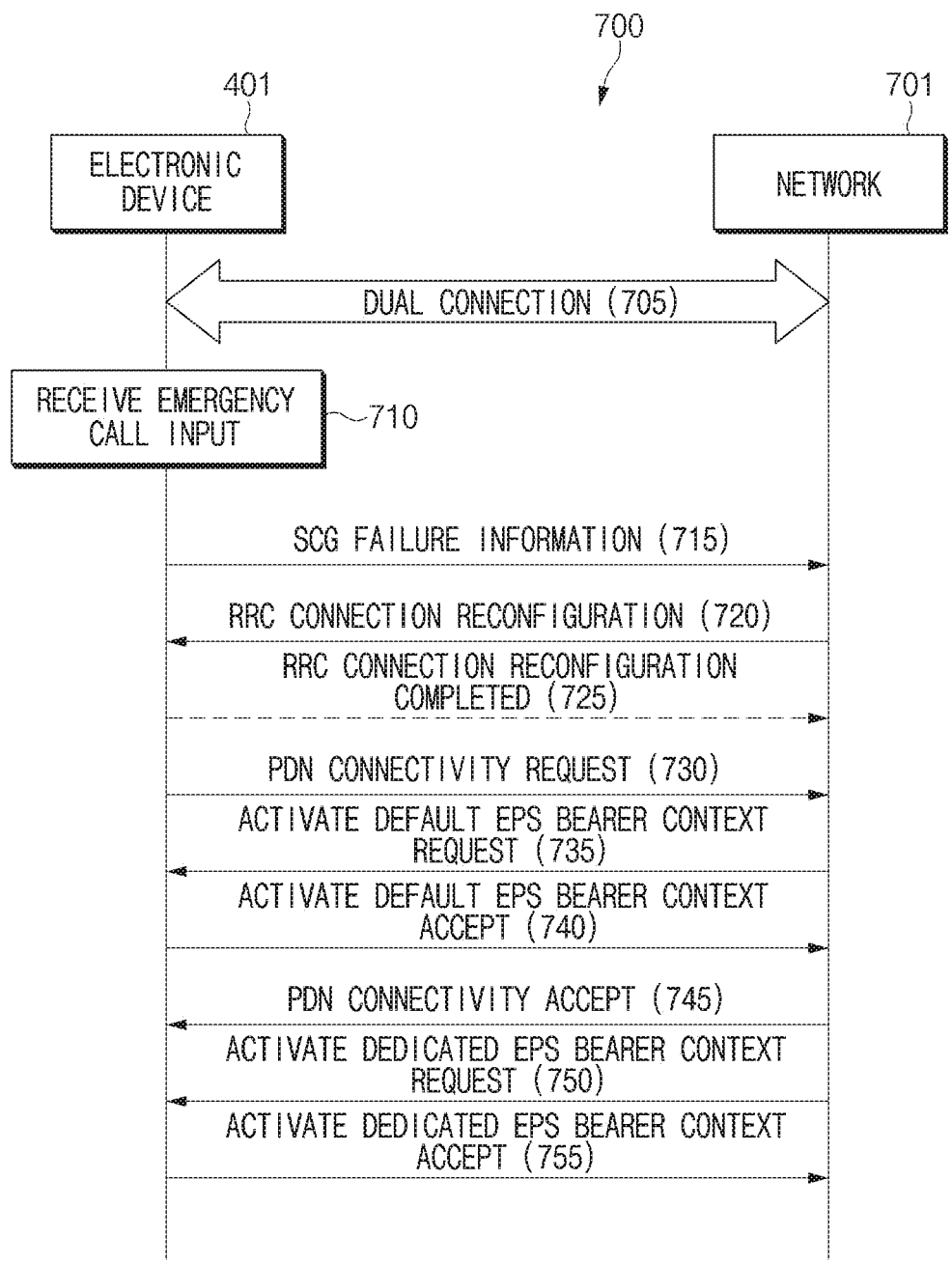
FIG. 7 illustrates a signal flow diagram of a method for establishing a connection by an electronic device according to an embodiment of the disclosure.

FIG. 7 illustrates a signal flow diagram of a method for establishing a connection by an electronic device according to an embodiment of the disclosure.

Referring to FIG. 7, in a signal flow diagram 700, the electronic device 401 may communicate with a network 701. For example, the network 701 may refer to the first base station 411, the second base station 412, and the second network 199 of FIG. 4. For example, communication between the electronic device 401 and the network 701 may be referred to as communication between the electronic device 401 and a base station (e.g., the first base station 411 or the second base station 412).

In operation 705, the electronic device 401 may be connected to the network 701 according to dual connectivity. For example, the electronic device 401 may be dually connected according to the network 701 and the MR-DC.

In operation 710, the electronic device 401 may receive an emergency call input. For example, the processor 420 may receive an emergency call input based on user input to a call application. Since the electronic device 401 is in a dual connection state and has received an emergency call request, both conditions of operations 510 and 515 of FIG. 5 are satisfied.

In the following, operations 715, 720, and 725 may correspond to operation 520 of FIG. 5. In operation 715, the electronic device 401 may transmit SCG failure information to the network 701. For example, the electronic device 401 may transmit the SCG failure information through RRC signaling. For example, the electronic device 401 may notify the network 701 that the electronic device 401 has disconnected from the SCG cell by transmitting the SCG failure information. For example, the SCG failure information may include information on the SCG failure cause. The electronic device 401 may set the information on the SCG failure cause to a specified value (e.g., emergency).

In operation 720, the network 701 may transmit the RRC connection reconfiguration to the electronic device 401. The RRC connection reconfiguration may be used to change a radio bearer received from the network 701 when the electronic device 401 has previously established RRC connection with the network 701. For example, the network 701 may transmit, to the electronic device 401, RRC connection reconfiguration indicating the removal of a radio bearer associated with the SCG. For example, the value of NR nr-Config-r15 of RRC connection reconfiguration may be set to release.

In operation 725, the electronic device 401 may transmit, to the network 701, a message indicating completion of the RRC connection reconfiguration. Operation 725 may be omitted.

In the following, operations 730 to 755 may correspond to a part of operation 525 of FIG. 5. For example, operations 730 to 755 may be referred to as part of a connection establishment procedure for performing a call.

In operation 730, the electronic device 401 may transmit a PDN connectivity request to the network 701. The electronic device 401 may transmit the PDN connectivity request to the network 701 for connection to the packet data network. For example, the request type of the PDN connectivity request may be set to emergency.

In operation 735, the network 701 may transmit an activate default evolved packet system (EPS) bearer context request to the electronic device 401. The network 701 may create a default bearer between the network 701 and the electronic device 401 after allocating an IP address to the electronic device 401. The network 701 may request the electronic device 401 to activate the default bearer context through the activate default EPS bearer context request. The activate default EPS bearer context request may include information on an access point name (APN) and/or an IP address of the electronic device 410. The default bearer may be allocated to the electronic device 401 for each APN. In this case, the APN of the default bearer may be set to SOS.

In operation 740, the electronic device 401 may transmit an activate default EPS bearer context accept. The electronic device 401 may configure a network interface according to the activate default EPS bearer context request and transmit a response to the activate default EPS bearer context request to the network 701.

In operation 745, the network 701 may transmit a PDN connectivity accept to the electronic device 401. Upon receipt of the PDN connectivity accept, the PDN connectivity procedure of the electronic device 401 may be successfully terminated.

In operation 750, the network 701 may transmit, to the electronic device 401, an activate dedicated EPS bearer context request. A dedicated bearer may be set for a specific packet service. For example, the dedicated bearer may be managed according to a quality of service (QoS) set for a specific packet service. For example, the network 701 may set an emergency bearer as the dedicated bearer. In operation 755, the electronic device 401 may transmit an activate dedicated EPS bearer context accept to the network 701.

After operation 755, the electronic device 401 may communicate with the network 701 through a set dedicated bearer. For example, the dedicated bearer may be a bearer related to the MCG of the electronic device 401.

Figure 8:
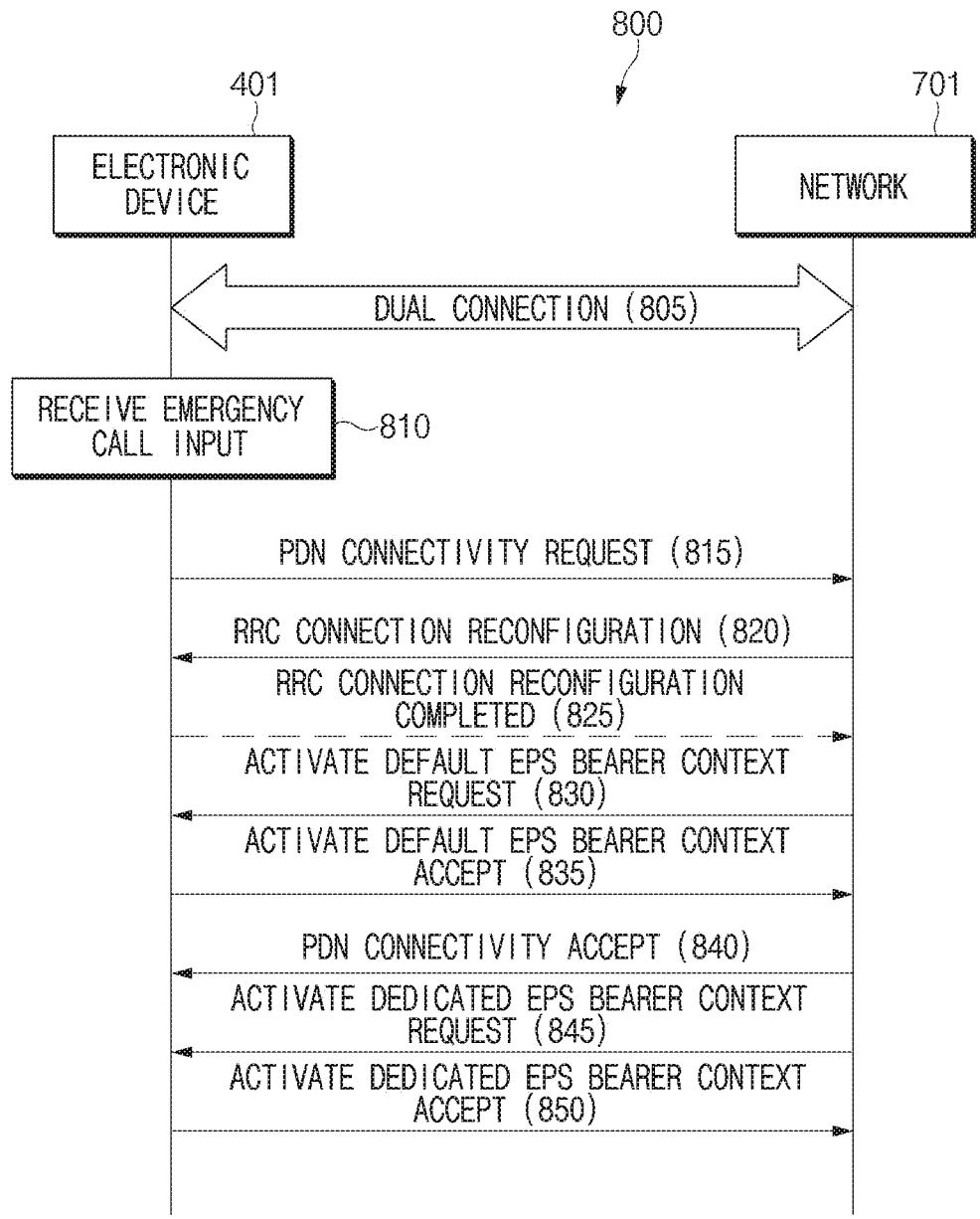
FIG. 8 illustrates a signal flow diagram of a method for establishing a connection by an electronic device according to an embodiment of the disclosure.

FIG. 8 illustrates a signal flow diagram of a method for establishing a connection by an electronic device according to an embodiment of the disclosure.

Referring to FIG. 8, in operation 805 of signal flow diagram 800, the electronic device 401 may be connected to the network 701 according to dual connectivity. For example, the electronic device 401 may be dually connected according to the network 701 and the MR-DC.

In operation 810, the electronic device 401 may receive an emergency call input. For example, the processor 420 may receive an emergency call input based on user input to a call application.

In operation 815, the electronic device 401 may transmit a PDN connectivity request to the network 701. The electronic device 401 may transmit the PDN connectivity request to the network 701 for connection to the packet data network. For example, the request type of the PDN connectivity request may be set to emergency.

In operation 820, the network 701 may transmit the RRC connection reconfiguration to the electronic device 401. For example, if the request type of the PDN connectivity request is set to emergency, the network 701 may identify whether the electronic device 401 has a dual connection. If the electronic device 401 is dually connected, the network 701 may transmit the RRC connection reconfiguration to the electronic device 401. For example, the network 701 may transmit, to the electronic device 401, RRC connection reconfiguration indicating the removal of a radio bearer associated with the SCG.

In operation 825, the electronic device 401 may transmit, to the network 701, a message indicating completion of the RRC connection reconfiguration. Operation 825 may be omitted.

In operation 830, the network 701 may transmit, to the electronic device 401, an activate default evolved packet system (EPS) bearer context request. The description of operation 830 may be referred to by description of operation 735 of FIG. 7.

In operation 835, the electronic device 401 may transmit an activate default EPS bearer context accept. The electronic device 401 may configure a network interface according to the activate default EPS bearer context request and transmit a response to the activate default EPS bearer context request to the network 701.

In operation 840, the network 701 may transmit a PDN connectivity accept to the electronic device 401.

In operation 845, the network 701 may transmit, to the electronic device 401, an activate dedicated EPS bearer context request. In operation 850, the electronic device 401 may transmit an activate dedicated EPS bearer context accept to the network 701. The descriptions of operations 845 and 850 may be referred to by descriptions of operations 750 and 755 of FIG. 7.

For example, the operation of the network 701 of FIG. 8 may be understood as the operation of any network entity. For example, the network entity may be at least one server device. The server device may include a wireless communication circuit, a processor, and a memory. For example, the memory may store one or more instructions for performing the network operation described above with respect to FIG. 7.

For example, the processor of the server device may receive a connection request requesting a connection to a packet data network (PDN) from an external electronic device using the wireless communication circuit (e.g., operation 815). The processor of the server device may acquire bearer information regarding at least one bearer associated with the external electronic device if a request type of the connection request corresponds to an emergency service, and transmit, to the external electronic device, a first signal for releasing a second bearer of a second radio access technology (RAT) if the bearer information indicates that the external electronic device is associated with a first bearer of a first RAT and the second bearer of the second RAT (e.g., operation 820). In this case, the first signal may include information for radio resource control (RRC) connection reconfiguration. The information for the RRC connection reconfiguration may indicate release of a cell associated with the second RAT. For example, an access point name (APN) of the first bearer may be set to SOS. The first RAT may be associated with long-term evolution (LTE), and the second RAT may be associated with new radio (NR).

Figure 9:
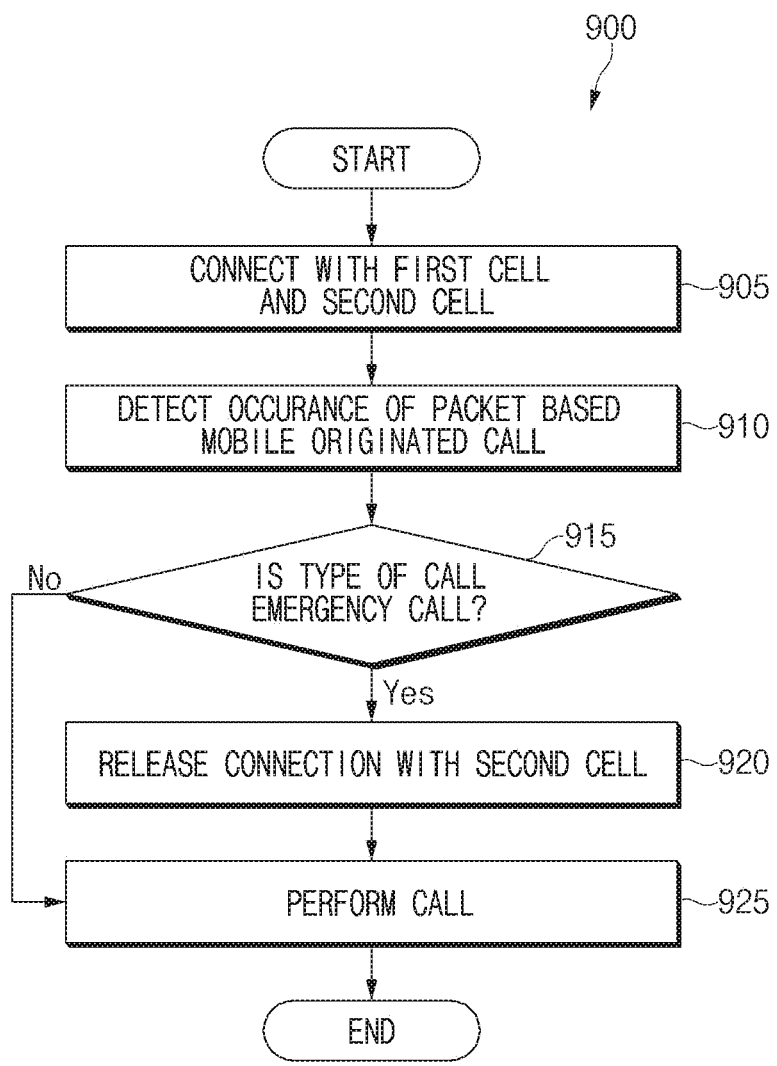
FIG. 9 illustrates a flowchart of a method for performing a call by an electronic device according to an embodiment of the disclosure.

FIG. 9 illustrates a flowchart of a method for performing a call by an electronic device according to an embodiment of the disclosure.

Referring to FIG. 9, an electronic device (e.g., the electronic device 401 of FIG. 4) may include at least one wireless communication circuit (e.g., the communication circuit 499 of FIG. 4), a processor (e.g., the processor 420 of FIG. 4) operatively connected with the at least one wireless communication circuit, and a memory (e.g., the memory 430 of FIG. 4) operatively connected with the processor. The memory may store one or more instructions that, when executed, cause the processor to perform operations to be described below.

In operation 905 of flowchart 900, the processor may connect with the first cell and the second cell. For example, the processor may connect with the first cell of the MCG and the second cell of the SCG using at least one wireless communication circuit. For example, the electronic device may be in an RRC connected state. For example, the first cell may be associated with the first RAT (e.g., LTE), and the second cell may be associated with the second RAT (e.g., NR).

In operation 910, the processor may detect the occurrence of a packet based mobile originated call. For example, the processor may detect the occurrence of a call according to operation 505 of FIG. 5.

In operation 915, the processor may determine whether the type of the call is an emergency call. For example, the processor may determine whether the type of the call is an emergency call according to operation 510 of FIG. 5.

If the type of the call is an emergency call (e.g., Yes in operation 915), in operation 920, the processor may release the connection with the second cell. For example, the processor may release the connection with the second cell according to operation 520 of FIG. 5. The processor may release the connection with the second cell by transmitting information indicating a radio link failure for the SCG to the first cell. For example, the processor may transmit information indicating a radio link failure through RRC signaling. In response to the information indicating the radio link failure, the processor may receive, from the first cell, information (e.g., information included in the RRC connection reconfiguration message) indicating release of the SCG set in the electronic device (e.g., release of the second cell). In operation 925, the processor may perform the call. In this case, since the connection with the second cell has been released, the processor may perform the mobile originated call through the first cell.

If the type of the call is not an emergency call (e.g., No in operation 915), in operation 925, the processor may perform the call. In this case, the processor may maintain the connection with the first cell and the second cell, and may perform the mobile originated call through the first cell and/or the second cell.

According to various embodiments of the disclosure, a method for releasing a connection with an SCG based on a service to be performed in an electronic device may be provided.

According to various embodiments of the disclosure, by releasing the connection with the SCG based on the service, it is possible to reduce power consumption and heat generation of the electronic device.

According to various embodiments of the disclosure, by releasing the connection with the SCG based on the service, it is possible to improve service reliability of the electronic device.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one wireless communication circuit;
   a processor operatively connected with the at least one wireless communication circuit; and
   a memory operatively connected with the processor, wherein the memory stores one or more instructions that, when executed, cause the processor to:
   connect with a first cell of a master cell group (MCG) and a second cell of a secondary cell group (SCG) using the at least one wireless communication circuit,
   detect occurrence of a packet based mobile originated call,
   release the connection with the second cell by transmitting information indicating a radio link failure for the SCG to the first cell through radio resource control (RRC) signaling upon determining that a type of the mobile originated call is an emergency call, and
   perform the mobile originated call through the first cell.

2. The electronic device of claim 1, wherein when executed, the one or more instructions further cause the processor to receive, from the first cell, information indicating release of the SCG set in the electronic device in response to the information indicating the radio link failure for the SCG.

3. The electronic device of claim 2, wherein the information indicating the release of the SCG is included in a radio resource control (RRC) connection reconfiguration message.

4. The electronic device of claim 1, wherein when executed, the one or more instructions further cause the processor to maintain the connection with the first cell and the second cell and perform the mobile originated call when the type of the mobile originated call is not an emergency call.

5. The electronic device of claim 1, wherein a first radio access technology (RAT) associated with the first cell and a second RAT associated with the second cell are different from each other.

6. The electronic device of claim 5, wherein the first RAT is associated with long-term evolution (LTE), and the second RAT is associated with new radio (NR).

7. A method for originating a call by an electronic device, the method comprising:
   connecting with a first cell of a master cell group (MCG) and a second cell of a secondary cell group (SCG);
   detecting occurrence of a packet based mobile originated call;
   releasing the connection with the second cell by transmitting information indicating a radio link failure for the SCG to the first cell through radio resource control (RRC) signaling upon determining that a type of the mobile originated call is an emergency call; and
   performing the mobile originated call through the first cell.

8. The method of claim 7, wherein the releasing of the connection with the second cell further includes receiving, from the first cell, information indicating release of the SCG set in the electronic device in response to the information indicating the radio link failure for the SCG.

9. The method of claim 8, wherein the information indicating the release of the SCG is included in a radio resource control (RRC) connection reconfiguration message.

10. The method of claim 7, further comprising maintaining the connection with the first cell and the second cell and performing the mobile originated call when the type of the mobile originated call is not an emergency call.

11. The method of claim 7, wherein a radio access technology (RAT) of the first cell is associated with long-term evolution (LTE), and a RAT of the second cell is associated with new radio (NR).

* * * * *